Sept. 16, 1969    C. J. STUART, JR    3,466,782
STATIONARY PLANKTON SAMPLER
Filed Oct. 19, 1967    3 Sheets-Sheet 2
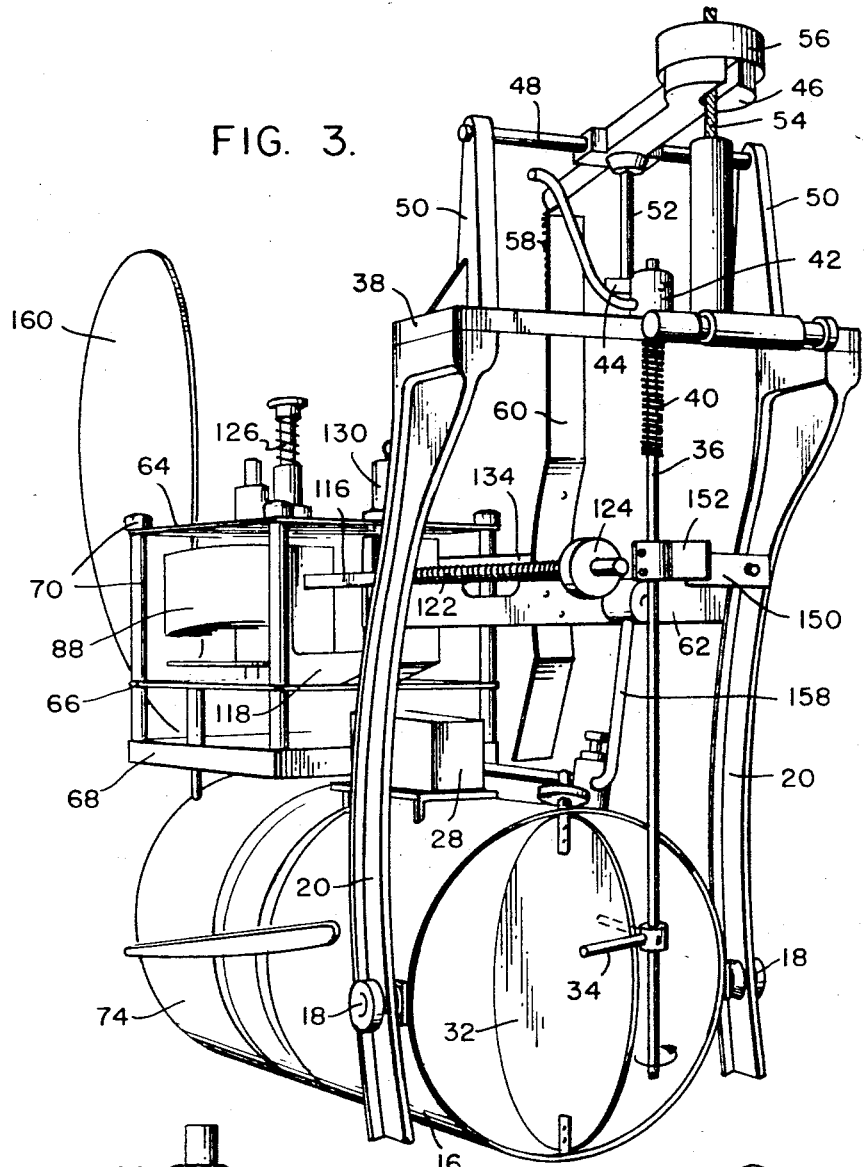
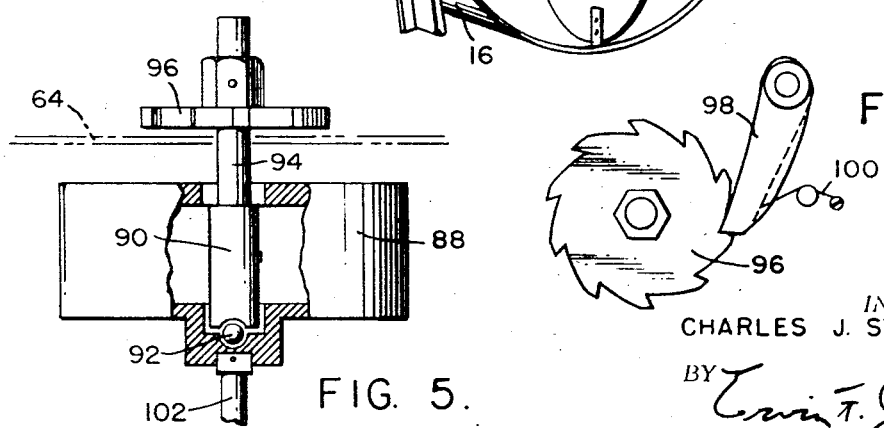
INVENTOR.
CHARLES J. STUART, JR.
BY
ATTORNEY.

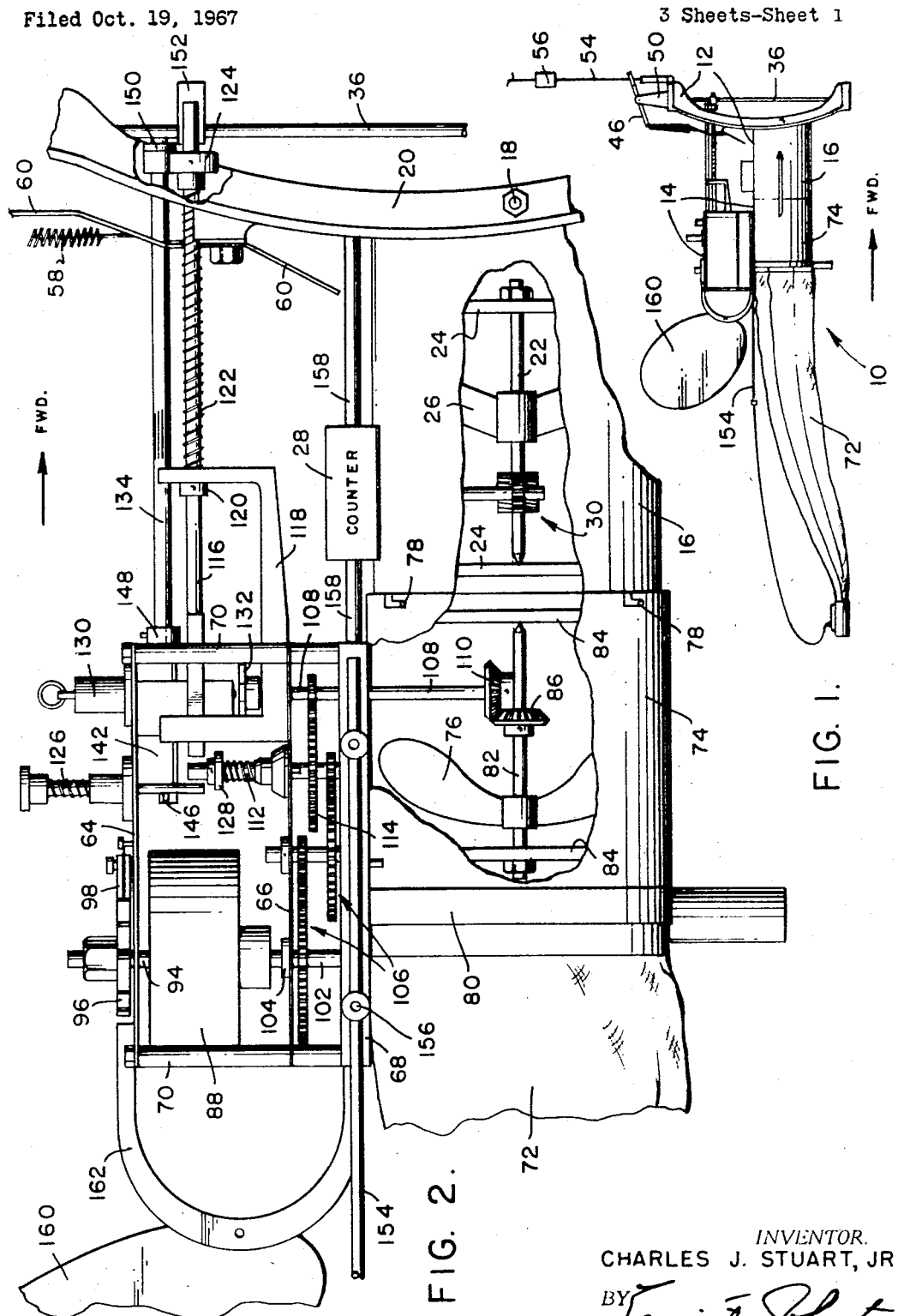

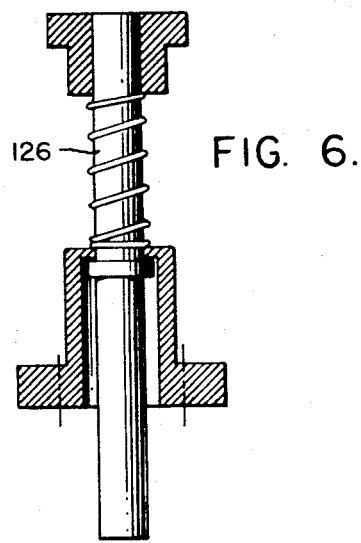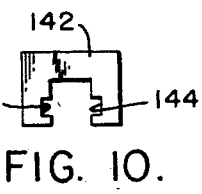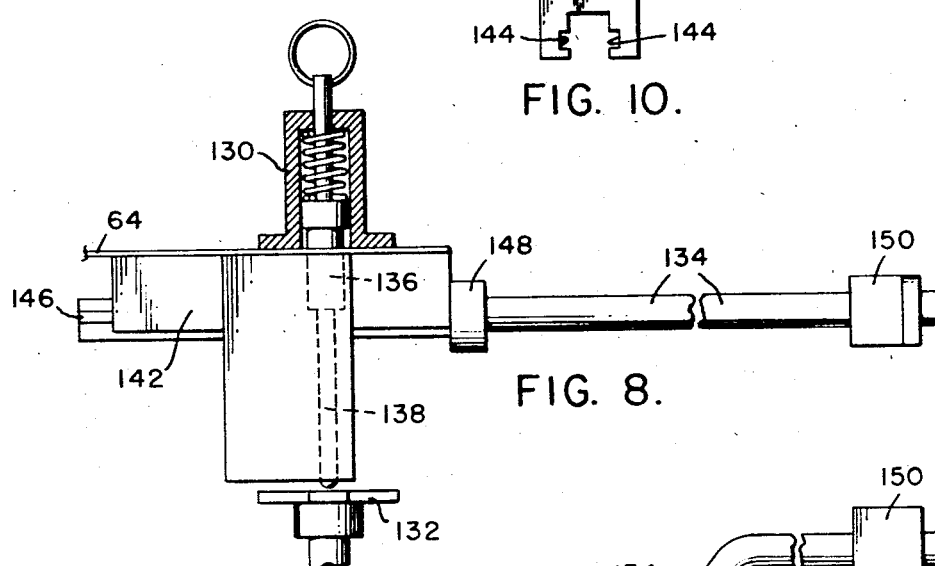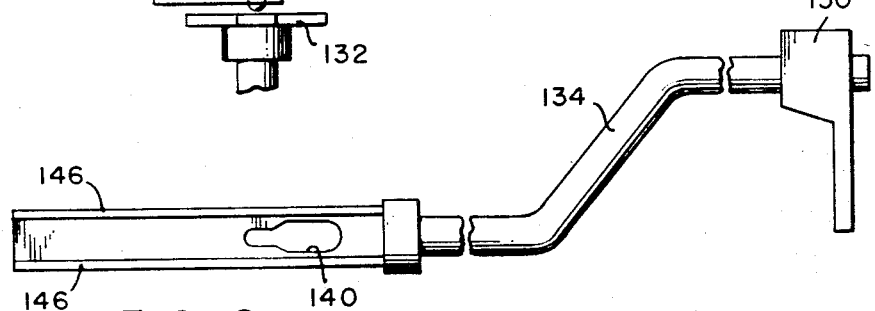

United States Patent Office 3,466,782
Patented Sept. 16, 1969

3,466,782
STATIONARY PLANKTON SAMPLER
Charles J. Stuart, Jr., Chula Vista, Calif., assignor to the United States of America as represented by the Secretary of the Navy
Filed Oct. 19, 1967, Ser. No. 677,006
Int. Cl. A01k 73/00; G01w 1/00
U.S. Cl. 43—4          10 Claims

ABSTRACT OF THE DISCLOSURE

A plankton sampler operated in a stationary condition within the ocean. The sampler includes a means for propelling a selected amount of ocean water through a plankton bag. The propelling means is driven by a power unit and several mechanisms are provided for starting and stopping the power unit so that the plankton bag receives the selected amount of water. The start and stop mechanisms are individually operated by a respective messenger which is dropped on a cable from a surface ship.

---

The invention described herein may be manufactured and used by or for the Government of the United States of America for governmental purposes without the payment of any royalties thereon or therefor.

The methods currently utilized in the investigation of plankton involve the use of collection devices falling into one of two categories: those which are towed and those which are operated while stationary. The former category contains a variety of nets and mechanisms, many of which can be operated both horizontally and vertically. The stationary category comprises those devices which instantaneously entrap a quantity of water and the attendant plankton population as well as pumping rigs which either convey their catch to the surface of filter it through a net at depths. Trapping devices are limited in the volume of water they can accommodate by virtue of their dimensions while pumping apparatus often requires an inordinate amount of ancillary equipment maintenance.

Horizontal towing has proven to be a satisfactory method of sampling under normal circumstances; however, there are several situations in which this method is found to be difficult or impossible. For example, shoal water may represent a hazard to the towing vessel; research may be desired near an irregular bottom which could jeopardize the sampling device; or ice cover may restrict the vessel's movements. In these instances the planktonologist is faced with the alternative of using a static sampler and must accept certain restrictions inherent in their design.

In the absence of shoal water or an irregular bottom condition the plankton sampler by Clarke and Bumpus has proven to be quite satisfactory. I have found that by combining this sampler with certain additional structure, which constitutes my invention, an overall resulting sampler can be provided which will acquire plankton samples while in a stationary condition. The Clarke-Bumpus sampler includes an impeller and a gate which are mounted within a hollow cylinder, the plankton bag being mounted to the aft end of the cylinder. While this hollow cylinder is being towed through the water the gate is selectively opened and closed by cable messengers and the revolutions of the impeller are recorded on a counter. My invention is cooperable with the Clarke-Bumpus sampler for propelling a selected amount of water therethrough. My invention includes a hollow cylinder which is connectable to the aft end of the Clarke-Bumpus cylinder and at the aft end of my cylinder I provide means for mounting the plankton bag. Within my hollow cylinder there is provided an impeller and this impeller is driven by a power unit which is selectively operated by start and stop mechanisms. The start and stop mechanisms are in turn operated by the same cable messengers which operate the gate of the Clarke-Bumpus sampler.

An object of the present invention is to overcome the aforementioned disadvantages of the prior art plankton samplers.

Another object of the present invention is to provide an efficient plankton sampler which can be operated in a stationary condition within the ocean.

A further object is to provide an apparatus which can be connected to the Clarke-Bumpus plankton sampler which will enable this sampler to operate in a stationary condition.

Other objects, advantages and novel features of the invention will become apparent from the following detailed description of the invention when considered in conjunction with the accompanying drawing wherein:

FIG. 1 is a side view of my invention, which is generally shown on the left side of the figure, connected to a Clarke-Bumpus sampler, which is generally shown on the right side of the figure;

FIG. 2 is an enlarged portion of FIG. 1 with portions of the various components cut away to show details;

FIG. 3 is an isometric view of the plankton sampler which is shown in FIG. 1;

FIG. 4 is a top view of a ratchet mechanism;

FIG. 5 is a side view of a portion of the ratchet mechanism and a spring drum which is partially cut away to show details;

FIG. 6 is a side view of my cocking assist plunger with portions shown in longitudinal cross section;

FIG. 7 is a side view of my motor cocking plunger with a portion shown in longitudinal cross section;

FIG. 8 is a side view of my stop plunger, shown partially in cross-section, a stop rod and a stop sprocket;

FIG. 9 is a top view of my stop rod; and

FIG. 10 is an end view of a portion of my stop mechanism.

Referring now to the drawings wherein like reference numerals designate like or similar parts throughout the several views, there is shown in FIG. 1 a stationary plankton sampler 10 which includes the combination of a Clarke-Bumpus sampler, which is generally designated at 12, and my selectively operable propelling apparatus, which is generally designated at 14. As shown in FIGS. 2 and 3, the Clarke-Bumpus sampler includes a hollow cylinder 16 which is pivotably connected at 18 to a generally rectangular frame assembly 20. Rotatably mounted within the hollow cylinder 16 by a shaft 22 and end supports 24 is an impeller 26. The impeller 26 is drivingly connected to a counter 28 by a shaft and gears, which are generally designated at 30, so that upon the passage of water through the hollow cylinder 16 the revolutions of the impeller 26 are recorded.

As shown in FIG. 3, the forward end of the hollow cylinder 16 is provided with a gate 32 which is spring biased (not shown) in a clockwise direction, when looking downwardly, for opening and closing the hollow cylinder 16. In FIG. 3 the gate 32 is shown in an open position and is being retained in such position by a catch 34 which is perpendicularly mounted to a gate release rod 36. When the gate release rod 36 is rotated 90° in a counterclockwise direction, when looking downwardly, the catch 34 will rotate free of the gate 32 and the gate will spring to a closed position.

The gate release rod 36 is rotatably mounted within a top cross frame member 38 and a similar bottom frame member (not shown), and it is biased in the counterclockwise direction by a torsion spring 40. A collar 42 mounts a pair of transverse pins 44 (only one being shown) to an extension of the gate release rod above the frame member 38. Above the pair of pins 44 there is provided a messenger receiver 46 which is adapted for pivotal movement by a shaft 48 which is rotatably connected to upstanding flanges 50 from the cross member 38. Extending downwardly from the messenger receiver 46 is a shaft 52 which is now located between the pair of pins 44 and is preventing the gate release rod 36 from counterclockwise rotation by engagement with the pin 44 which is not shown. Upon upward movement of the shaft 52 the bottom end thereof will clear the pin 44 and the gate release rod 36 will rotate to allow the gate 32 to spring to a closed position.

A forward end of the cable messenger is notched for receiving a cable 54 from a surface ship, and the top of this end portion is adapted to receive the striking blow of a messenger 56 which slides down the cable. The after end of the messenger receiver 46 is biased downwardly by a tension spring 58 which is connected at one end to the messenger receiver 46 and is connected at another end to a generally vertical strap 60 which in turn is connected to a frame cross plate 62. It can now be seen that when a messenger 56 strikes the receiver 46 that the shaft 52 is raised to clear the pair of rods 44. When the sampler is first placed on the water the rod 44 (which is shown) is on the other side of the shaft 52 and the first messenger 56 upon striking the receiver 46 raises the shaft 52 only for a sufficient time to clear the rod 44 (which is shown) and engage the other rod 44 (not shown) before it can pass thereby. This operation opens the gate 32 to the position shown in FIG. 3 and it should be noted that the springs 40 and 58 as well as the weight of the messenger 56 must be designed so that the shaft 52 catches the rod 44 (not shown) before it can pass thereby. The dropping of the second messenger (not shown) will once again raise the shaft 52 and allow the second rod (not shown) to swing by the shaft 52 resulting in a closure of the gate 32.

My invention is adapted for easy connection and cooperation with the above described Clarke-Bumpus sampler for the purpose of converting this sampler to stationary operation in contrast to towed operation. It will be noted in this specification that certain elements of the Clarke-Bumpus sampler cooperate and operate in a unique manner with certain elements of my apparatus. In some instances this unique cooperation has been brought about by slight modifications to the Clarke-Bumpus sampler. Accordingly, some embodiments of my invention will include certain elements of the Clarke-Bumpus sampler.

My apparatus has a support means which is adapted to be connected to the cable 54. As shown in FIG. 2, the support means may include top, middle, and bottom plates shown at 64, 66 and 68 respectively, which plates are connected in a parallel spaced relationship by spacer posts and bolts generally indicated at 70. The bolts may be threaded within the bottom plate 68.

Mounted to the underside of the bottom plate 68 by any suitable means such as welding or bolting there is provided a means, which has a water entrance and exit, for propelling water, the exit of said means being adapted to mount a plankton bag 72. This propelling means may include a hollow cylinder 74 and an impeller 76 mounted therein. The water entrance end of the cylinder 74 may be provided with a bayonet type of connection 78 to the Clarke-Bumpus hollow cylinder 16. The plankton bag 72 may be connected to the water exit end of the hollow cylinder 74 by any suitable means such as a band 80 which is secured by a clamp (not shown). The impeller 76 is mounted on a shaft 82 which in turn is rotatably supported at its ends by transverse support posts 84. Connected to the shaft 82 intermediate its ends is a bevel gear 86 which has a purpose to be described in detail hereinafter.

Also mounted to the support means is a power means such as a spring drum 88. As shown in FIG. 5 an arbor 90 is rotatably mounted within the spring drum 88 by a ball 92 and an upwardly extending shaft 94. The shaft 94 may extend upwardly through the top plate 64 and may extend therebeyond to receive a ratchet gear 96. As shown in FIG. 4 a ratchet catch 98 may be pivotably mounted to the top plate 64 adjacent the ratchet gear 96 and may be spring biased toward the ratchet gear by any suitable means such as a leaf spring 100. Upon turning the ratchet gear 96 clockwise, as seen in FIG. 4, the arbor 90 will turn in the same direction. Connected between the arbor 90 and the spring drum 88 is a coil spring (not shown) so that as the arbor 90 is rotated the spring is wound. At the bottom of the spring drum 88 there is connected a shaft 102 which extends downwardly through the middle plate 66 for a purpose to be described hereinafter. Subsequent elements, also to be described hereinafter, retain the shaft 102 during winding of the arbor 90 and spring, and release the shaft 102 so that the spring operates on the drum 88 to rotate the shaft 102 at a selected time. As shown in FIG. 2, it is to be noted that the shafts 94 and 102 position the spring drum 88 between the top and middle plates 64 and 66 respectively. A collar 104 on the shaft 102 provides a spaced positioning of the spring drum 88 with relationship to these plates.

Mounted to the support means is a drive means which connects the power means to the impeller 76. As shown in FIG. 2, the drive means may include a gear train, generally indicated at 106, which may be mounted to and located between the middle and bottom plates 66 and 68 respectively. The gears may be spur gears and are shown disposed in a parallel relationship between the plates. The first gear may be connected to the shaft 102 and the last gear may be connected to a shaft 108 which extends through and beyond both of the plates 66 and 68. Connected to the bottom extension of the shaft 108 there may be provided a beveled gear 110 which meshes with the gear 86 so as to complete the driving connection between the spring drum 88 and the impeller 76. Certain start and stop mechanisms which are responsive to cable messengers 56 will be described hereinbelow for applying and terminating power to the impeller 76 through the gear train 106.

In order to commence rotation of the impeller 76 a means, mounted to the support means, may be provided for locking and unlocking the gear train 106. As shown in FIGS. 2 and 7, this locking and unlocking means may include a spring biased cocking plunger 112 which may be located between the top and middle plates 64 and 66 and may be connected by any suitable means, such as welding, in a perpendicular fashion to the middle plate 66. As shown in FIG. 2 the bottom end of the plunger 112 may extend downwardly below the middle plate 66 and may be movable between a downwardly or depressed position and an upwardly or retracted position. The bottom end of the plunger 112 is positioned over the body of an intermediate gear 114 and this gear may be provided with an aperture (not shown) for receiving this bottom plunger end. The cocking plunger 112 in its depressed position will be received within the gear aperture thereby lockingly engaging the gear train 106 so as to prevent the spring drum 88 from rotating the impeller 76. In its retracted position, which is the position shown in FIG. 2, the bottom end of the plunger 112 frees the gear train 106 so that power is applied to the impeller 76. Since the aperture (not shown) is radially disposed from the axis of the intermediate gear 114, this gear must be rotated to an appropriation position for receiving the bottom end of the plunger 112. If desired a series of such apertures may be located on such radius of the intermediate gear 114.

In order to operate the plunger 112 a first trigger means, mounted to the support means, may be provided for triggering the plunger 112 from a locked to an unlocked condition. The plunger 112, shown in FIG. 2, is presently in an unlocked condition. The first trigger means may include a spring biased trigger shaft 116 which extends transverse the cocking plunger 112 and is movable between an aft or depressed position and a forward or retracted position. The trigger shaft, shown in FIG. 2, is presently in the retracted position. The trigger shaft 116 in its depressed position is disposed over the top end of the cocking plunger 112 to engage such end and retain the cocking plunger 112 in its depressed position. The trigger shaft 116 in its retracted position, which position is shown in FIG. 2, frees the cocking plunger 112 to move to its retracted position, which position is shown in FIG. 2. The trigger shaft 116 is adapted for this reciprocal movement by a channel element 118 which may be connected by any suitable means, such as welding, to the top of the middle plate 66. The trigger shaft 116 may be slidably mounted through both legs of the channel 118 and may be limited in its movement by a collar 120. A spring 122 may be disposed between the forward leg of the channel 118 and another collar 124 to provide the biasing action of the trigger shaft 116.

In order to set the cocking plunger 112 it is depressed until the bottom end of the plunger engages the intermediate gear 114 within its aperture (not shown) and the trigger shaft 116 is moved to its depressed position over the plunger 112 so that the plunger 112 is retained in locking engagement with the intermediate gear 114. In order to assist the cocking of the plunger 112 there may be provided a spring biased cocking assist plunger 126 which may be mounted by any suitable means to the top plate 64. The cocking assist plunger 126 extends below the top plate 64 and is engageable with an annular flange 128 of the plunger 112 so that when the plunger 126 is depressed the plunger 112 is likewise depressed so that the trigger shaft 116 can be disposed thereover. The detail of the cocking assist plunger 126 is shown in FIG. 6. A means for retaining the trigger shaft 116 in its depressed position will be described in detail hereinafter.

As previously described the cocking plunger 112 upon release will unlock the gear train 106 so that the spring drum 88 applies power for rotating impeller 76. The rotation of the impeller 76 propels ocean water into the plankton bag 72 so that plankton samples can be collected. After a selected period of time it is desirable to stop the rotation of the impeller 76 and retrieve the plankton sampler. In order to stop impeller rotation I have provided a means, which is mounted to the support means, for stopping the gear train 106 after the gear train has been unlocked by the plunger 112 and trigger shaft 116 a selected period of time. This stop means, which is shown in FIG. 2 and in detail in FIGS. 8, 9, and 10, may include a spring biased stop plunger 130 which may be mounted by any suitable means, such as welding, to the top plate 64. The upward extension of the shaft 108, as seen in FIG. 2, may be provided at its top end with a sprocket 132 which is disposed with its teeth located directly below a bottom end extension of the stop plunger 130. The stop plunger 130 is movable between a downward or depressed position and an upward or retracted position. The stop plunger 130 is shown in the figures in its retracted position. The stop plunger in its depressed position lockingly connects with the gear train 106 by engaging the sprocket 132 between its teeth, and in its retracted position it frees the gear train 106 by being withdrawn from the sprocket 132.

The operation of the stop plunger 130 from its retracted position to its depressed position is enabled by a second trigger means which is mounted to the support means. As shown in FIGS. 2, 8, and 9 the second trigger means may include a stop rod 134 which is movable transverse the stop plunger 130 between first and second positions. The stop rod 134 in its first position retains the stop plunger 130 in its retracted position and the stop rod in the second position releases the stop plunger 130 to its depressed position. In the figures the stop rod is shown in its first position and the stop plunger 130 is shown in its retracted position. In order to provide for the retaining and releasing actions of the stop plunger 130 the plunger may be provided with an enlarged and reduced bottom portion 136 and 138 respectively. An after end of the stop rod 134 is provided with an aperture 140 which has an enlarged portion and a reduced portion for slidably receiving the enlarged and reduced portions of the stop plunger 130. The enlarged aperture portion will receive both diameters of the plunger portions 136 and 138, however the reduced aperture portion will only receive the reduced diameter portion 138 of the stop plunger. Accordingly, when the stop plunger is in its first position, as shown in FIGS. 8 and 9, the reduced aperture portion retains the stop plunger in its retracted position by engaging the bottom of the enlarged plunger portion 136. When the stop rod 134 is moved to its second position or to the left as shown in the figures, the enlarged aperture portion is moved below the enlarged plunger portion 136 and the stop plunger 130 is then free to move to its depressed position. The stop rod is guided in its movement between its first and second positions by a guide housing 142 which may be connected by any suitable means to the bottom of the top plate 64. As shown in FIG. 10 the guide 142 may be provided with a pair of opposed passageways 144 which form a track for oppositely disposed rails 146 on the stop rod 134. The stop rod 134 may be stopped in its second position by a collar 148 and at the forward end of the stop rod there may be provided a flanged collar 150 for purpose to be described hereinafter.

It is desirable that the starting and stopping of impeller rotation be controlled by messengers 56 (see FIG. 3) which are sent down the connecting cable 54 between a surface ship and the plankton sampler. Such control has been provided for by a control means which is responsive to this cable messenger for selectively actuating the trigger shaft 116 from its depressed position to its retracted position and selectively operating the stop rod 134 from its first position to its second position. This control means includes certain portions of the Clarke-Bumpus sampler as well as a motor control plate 152 (see FIG. 3) which may comprise a flanged collar which is fixedly connected to the gate release rod 36. The motor control plate 152 is rotatable from an engaging position with the trigger shaft 116 to hold this shaft in its depressed position to an engagement with the flanged collar 150 of the stop rod 134 so as to drive the stop rod to its second position. The dropping of the first messenger 56 will operate to rotate the motor control plate 90° from the trigger shaft 116 and upon dropping the second messenger (not shown) the motor control plate will rotate another 90° to engage and and push the stop rod 134 to release the stop plunger 130. The position of the motor control plate 152 in FIG. 3 is just after dropping the first cable messenger 56.

In order to keep the plankton bag 72 aligned generally horizontally with the hollow cylinder 74, as shown in FIG. 1, I have provided a net rod 154, as seen in FIG. 2, which may be connected to the bottom plate 68 by any suitable means such as securing posts 156. The sampler may be maintained substantially perpendicular to the rectangular frame 20 by a 90° rod 158 which is secured to the transverse cross support plate 62 (see FIG. 3) and to the hollow cylinder 16. The rod 158 may also be secured to the hollow cylinder 74 by a securing means which is not shown. A rudder 160 has been mounted to the top and bottom plates 64 and 68 by an arcuate element 162 for the purpose of stabilizing the sampler when it is towed in the water to a desired location.

In the operation of the plankton sampler the components are assembled as shown in FIG. 2. Before dropping the sampler from a surface ship the spring drum 88 is wound tautly and the cocking assist plunger 126 is depressed against the plunger 112 so that the trigger shaft 116 retains the plunger 112 in its depressed position. The gear train 106 is now locked so that power cannot be applied to the impeller 76. The gate release rod 36 is rotated to its extreme clockwise position where the motor control plate 152 maintains the trigger shaft 116 over the plunger 112 and the gate release catch 34 maintains the gate 32 in a closed position. The sampler is then dropped into the ocean by the cable 54 and lowered to a desired depth. After towing the sampler to a location where a plankton sample is desired the first messenger 56 is dropped whereupon the motor control plate rotates 90° to free the gear train 106 and commence rotation of the impeller 76. Simultaneously the gate release catch 34 opens the gate 32 to allow entrance of sea water. Water is now being propelled into the plankton bag 72 and the quantity of water propelled is being counted by the counter 28. After a selected period of time a second messenger (not shown) is dropped whereupon the motor control plate will rotate another 90° to engage and push the stop rod 134 so as to release the stop plunger 130. The release of the stop plunger 130 causes its bottom end to engage the stop sprocket thereby locking the gear train 106 and stopping rotation of the impeller 76. Simultaneously the catch 34 closes the gate 32 to prevent the entrance of any water. The sampler may now be retrieved and the plankton bag 72 removed to investigate the catch.

Obviously many modifications and variations of the present invention are possible in the light of the above teachings. It is therefore to be understood that the invention may be practiced otherwise than as specifically described.

I claim:

1. A stationary plankton sampler comprising:
   support means adapted to be connected to a cable;
   means, mounted to the support means and having a water entrance and exit, for propelling water, the exit of said means being adapted to mount a plankton bag;
   power means mounted to the support means;
   drive means mounted to the support means and connecting the power means to the propelling means;
   means, mounted to the support means, for locking and unlocking the drive means;
   a first trigger means, mounted to the support means, for triggering the locking and unlocking means from a locked to an unlocked condition;
   means, mounted to the support means, for stopping the drive means after the drive means has been unlocked by the first trigger means; and
   a second trigger means mounted to the support means for triggering the stop means,
   whereby water can be selectively passed into the plankton sampler for a selected period of time.

2. A stationary plankton sampler as claimed in claim 1 wherein:
   the drive means is a gear train; and
   the locking and unlocking means includes a spring biased cocking plunger which is movable between depressed and retracted positions, the cocking plunger in its depressed position lockingly engaging the gear train and the cocking plunger in its retracted position freeing the gear train.

3. A stationary plankton sampler as claimed in claim 2 wherein:
   the first trigger means includes a spring biased trigger shaft which extends transverse the cocking plunger and is movable between depressed and retracted positions, the trigger shaft in its depressed position engaging and retaining the cocking plunger in its depressed position and the trigger shaft in its retracted position freeing the cocking plunger to move to its retracted position.

4. A stationary plankton sampler as claimed in claim 3 wherein:
   the stop means includes a spring biased stop plunger which is movable between depressed and retracted positions, the stop plunger in its depressed position lockingly connecting with the gear train and the stop plunger in its retracted position freeing the gear train.

5. A stationary plankton sampler as claimed in claim 4 wherein:
   the second trigger means includes a stop rod which is movable transverse the stop plunger, the stop rod in a first position retaining the stop plunger in its retracted position and in a second position releasing the stop rod to its depressed position.

6. A stationary plankton sampler as claimed in claim 5 including:
   control means responsive to a cable messenger for selectively actuating the trigger shaft from its depressed position to its retracted position and selectively operating the stop rod from its first position to its second position.

7. A stationary plankton sampler as claimed in claim 6 wherein:
   the support means includes top, middle and bottom plates;
   the gear train being mounted to and located between the middle and bottom plates;
   the cocking plunger being mounted to and extending through the middle plate to be engageable with the gear train;
   a sprocket located between the middle and top plates and drivingly connected to said gear train through the middle plate; and
   the stop plunger being mounted to and extending through the top plate so as to be engageable with said sprocket.

8. A stationary plankton sampler as claimed in claim 7 wherein:
   the support means further includes a vertical frame;
   the control means being mounted to said vertical frame; and
   the trigger shaft and the stop rod being mounted to the middle and top plates respectively and extending transverse said vertical frame.

9. A stationary plankton sampler as claimed in claim 8 wherein:
   the propelling means includes a hollow cylinder and an impeller mounted therein;
   the hollow cylinder being mounted to the bottom of the bottom plate; and
   means extending through the bottom plate and drivingly connecting the gear train to said impeller.

10. A stationary plankton sampler as claimed in claim 9 wherein:
    the power means includes a spring drum and arbor which are mounted between the top and middle plates; and
    ratchet means drivingly connected to the arbor.

References Cited

UNITED STATES PATENTS

| | | | |
|---|---|---|---|
| 2,720,047 | 10/1955 | Isaacs | 43—7 |
| 3,242,740 | 3/1966 | Niskin | 73—425.4 |
| 3,310,984 | 3/1967 | Swanson | 43—4 X |
| 3,412,498 | 11/1968 | Niskin | 43—8 |

WARNER H. CAMP, Primary Examiner

U.S. Cl. X.R.

43—7; 73—170, 421